United States Patent [19]
Seidler

[11] 3,758,679
[45] Sept. 11, 1973

[54] PROPOXYPHENE NAPSYLATE TIMED-RELEASE PARTICLES

[75] Inventor: Werner M. K. Seidler, Indianapolis, Ind.

[73] Assignee: Eli Lilly and Company, Indianpolis, Ind.

[22] Filed: Feb. 22, 1972

[21] Appl. No.: 227,920

[52] U.S. Cl................... 424/19, 264/141, 264/143, 424/22, 424/361, 424/362
[51] Int. Cl........................................... A61k 27/12
[58] Field of Search ............... 424/19, 22; 264/141, 264/143

[56] References Cited
UNITED STATES PATENTS

| | | | |
|---|---|---|---|
| 3,555,144 | 1/1971 | Pazar et al. | 424/002 |
| 2,895,880 | 7/1959 | Rosenthal | 424/359 X |

*Primary Examiner*—Shep K. Rose
*Attorney*—Everet F. Smith et al.

[57] ABSTRACT

A pharmaceutical preparation is described which comprises particles of propoxyphene napsylate having timed-release properties.

14 Claims, 1 Drawing Figure

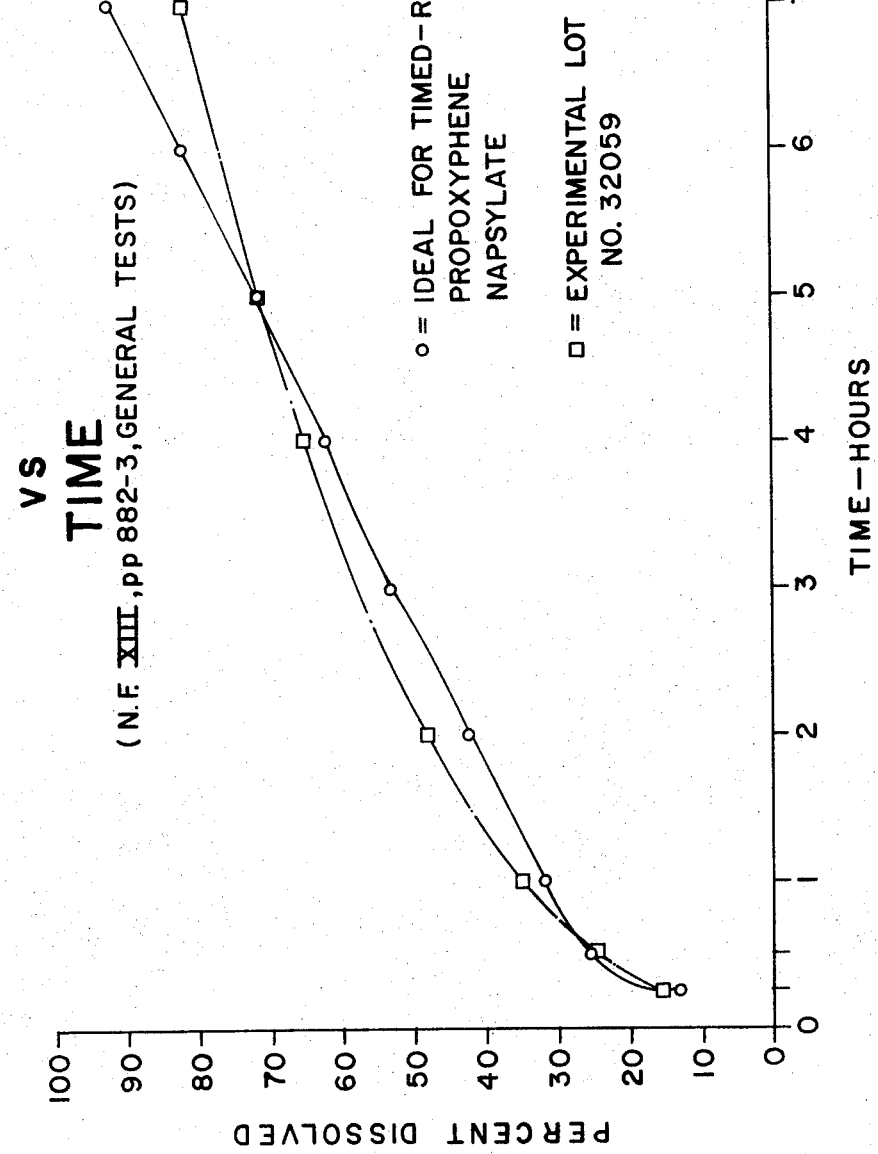

PROPOXYPHENE NAPSYLATE TIMED-RELEASE PARTICLES

BACKGROUND OF THE INVENTION

1. Field of Invention

This invention relates to a pharmaceutical preparation for oral administration. Specifically this invention provides a preparation for timed-release particles of propoxyphene napsylate and a method for preparing such particles.

2. Description of the Prior Art

Propoxyphene napsylate is described in U.S. Pat. No. 3,065,261. A related compound, propoxyphene hydrochloride has become accepted throughout the world as a superior, non-addicting analgesic. The analgesic properties of propoxyphene napsylate are on a par, mole or propoxyphene per mole of propoxyphene, with propoxyphene hydrochloride. And, because of its chemical properties, propoxyphene napsylate is preferred over propoxyphene hydrochloride for pharmaceutical compounding.

Timed-release pharmaceutical preparations have become well accepted in the pharmaceutical art over the past several decades. The National Formulary recognizes "Timed-Release Tablets and Capsules," and describes such dosage forms thusly:

"As understood here, timed-release would include those tablets and capsules variously known as 'delayed-action,' 'extended-release,' 'prolonged-action,' or 'repeat action,' but would not include tablets specifically identified as 'enteric coated.'"
[N.F. XIII, 882, (1970)].

Applicant adopts the above definition, and this specification is to be read in such context.

Compositions of timed-release preparations and methods by which such are prepared comprise a substantially body of pharmaceutical art. Many United States and foreign patents have issued in this field. Generally, the timed-release preparations of the prior art have comprised coatings with waxes, fats, derivatives of such waxes and fats, and various cellulosics and synthetic polymers, inter alia. Other prior art timed-release preparations have featured the development of an insoluble matrix within which the active agent is enclosed or ensconced. Representative of these many patents are U.S. Pat. No. 2,921,883, directed to various coating materials, and U.S. Pat. No. 2,665,236 directed to a paraffin wax matrix in a tablet composition.

None of these prior art preparations and methods provides a means for obtaining a timed-release preparation of propoxyphene napsylate that assures consistent and uniform dissolution rates from batch to batch. Particle coating has not been standardized to the point where every particle is coated with the same amount of wax, fat, cellulosic material or whatever as every other particle. And a matrix formed under the pressure of a tablet press is no more uniform.

Accordingly, it is an object of this invention to provide a pharmaceutical preparation comprising propoxyphene napsylate that has a timed-release properties.

Another object of this invention is to provide a method for preparing a timed-release pharmaceutical preparation of propoxyphene napsylate.

SUMMARY

It has now been discovered that a pharmaceutical preparation comprising an extrudate comprised of (a) an initimate admixture consisting of propoxyphene napsylate and an excipient or combination of excipients selected from the group consisting of gelatinized starch, microcrystalline cellulose, and a saccharide selected from the class consisting of sucrose, dextrose, lactose, fructose, and maltose, and (b) a granulating agent selected from the class consisting of partially hydrolyzed starch, sodium carboxymethylcellulose, methyl cellulose, hydroypropylmethylcellulose, and polyvinylpyrrolidose has timed-release properties.

It has further been discovered that a timed-release pharmaceutical preparation of propoxyphene napsylate can be formed by: (a) thoroughly blending propoxyphene napsylate into an intimate admixture with one or more of the excipients described hereinbefore, (b) preparing an aqueous disersion of one of the granulating agents listed above, and thoroughly mixing such aqueous dispersion with the intimte admixture of (a) until a plastic dough-like composition is achieved, (c) extruding the plastic dough-like composition of (b) under pressure through a perforated plate having relatively small apertures into elongated strands of extrudate, and (d) either drying the extrudate of (c) and reducing the elongated strands to particles having essentially equal cross-sectional and longitudinal axes, or, preferably, contacting the elongated strands of extrudate of (c) with a moving frictional plate, imparting motion to said extrudate and developing a tumbling, rolling bed thereof wherein the strands are reduced to particles having essentially equal cross-sectional and longitudinal axes, and drying the thus formed particles to remove excess moisture.

BRIEF DESCRIPTION OF THE GRAPH

FIG. 1 is a graph showing the percent propoxyphene napsylate dissolved in an N.F. extracting fluid vs. time under test, and a visual comparison of the profile of an actual experimental lot and the ideal projected for a timed-release pharmaceutical preparation of propoxyphene napsylate.

DESCRIPTION OF THE PREFERRED EMBODIMENTS

One aspect of this invention relates to a novel pharmaceutical preparation for oral administration which imparts timed-release characteristics to propoxyphene napsylate. This novel pharmaceutical preparation is an extrudate comprised of (a) an intimate admixture of propoxyphene napsylate and an excipient or combination of excipients selected from the group consisting of gelatinized starch, microcrystalline cellulose, and a saccharide selected from the class consisting of succrose, dextrose, lactose, fructose, and maltose, and (b) a granulating agent selected from the group consisting of partially hydrolyzed starch, sodium carboxymethylcellulose, methylcellulose, hydroxypropylmethylcellulose, and polyvinylpyrrolidone.

Propoxyphene napsylate possesses two asymmetric carbon atoms. Accordingly, four different forms of the compound are possible, these consisting of two diastereoisomeric pairs, each of which can be resolved into dextro-(d-) and levo-(1-) rotary isomers. Since it is not possible at present to assign an absolute spatial configuration to the diastereo-isomeric pairs, they have been arbitrarily designated as the α- and β-isomers, the designation α- having been given to that diastereoisomeric pair, or more properly, racemic pair, which has the lower solubility. Chemically, propoxyphene napsylate is 1,2-diphenyl-2-propionoxy-3-methyl-4-dimethylaminobutane 2-naphthalenesulfonate. The α-d-form of the aforementioned compound is an effective analgesic and the α-l-form is an antitussive of merit. For the purposes of this invention, propoxyphene napsylate refers to either the α-d- or α-l-form or any combination thereof. U.S. Pat. No. 3,065,261 describes the preparation and use of both forms.

The novel pharmaceutical preparation of this invention can contain from about 50 to about 80 percent by weight or propoxyphene napsylate, and, in addition thereto, one or more excipients and a granulating agent.

Excipients which have been found to be useful include: gelatinized starch, microcrystalline cellulose, and the saccharides: sucrose, dextrose, lactose, frustose and maltose.

Gelatinized starch is a pregelatinized starch which has been hydrolyzed by cooking in an aqueous medium until most, if not all, of the starch cells have become completely hydrated and ruptured. Gelatinized starch is generally utilized in a powder form which is prepared by spray drying the thoroughly cooked starch dispersion.

Granulating agents which are suitable for inclusion in the useful pharmaceutical preparation of this invention are partially hydrolyzed starch, sodium carboxymethylcellulose, methylcellulose, hydroxypropylmethylcellulose and polyvinyl-pyrrolidone.

Partially hydrolyzed starch is well known in the pharmaceutical art as a granulating agent. It is generally prepared by adding from about 1.0 to about 10.0 percent by weight of a commercial starch powder to water at or about room temperature and cooking the resulting starch disersion for from about 1 to about 5 minutes at from about 40° to about 70° C. A slight thickening results from the cooking as some, but not all, of the starch cells are hydrated or ruptured. Partially hydrolyzed starch is employed as a paste in granulating procedures. Later the moisture is removed from the granulation by drying.

In the intimate admixture comprised of propoxyphene napsylate and one or more of the aforementioned excipients, gelatinized starch can be present in an amount up to about 5 percent by weight of the total. Gelatinized starch is not, however, a required ingredient, and when it is employed, in view of the maximum concentration of about 80 percent by weight for propoxyphene napsylate, one or more additional excipients are required. For example, gelatinized starch must be combined with either microcrystallined cellulose or a saccharide selected from the class consisting of sucrose, dextrose, lactose, fructose, and maltose, or any combination thereof.

Microcrystalline cellulose is another ingredient which can be utilized as an excipient, usually in an amount of up to about 25 percent by weight of the total intimate admixture. When the concentration of propoxyphene napsylate is 75 percent or more in the intimate admixture, microcrystalline cellulose can constitute the sole excipient. And when the propoxyphene napsylate is less than 75 percent of the total, microcrystalline cellulose can be supplemented with gelatinized starch powder in an amount up to about 5 percent of the total intimate admixture.

Another pharmacologically inert excipient which can be used is a saccharide selected from the class consisting of sucrose, dextrose, lactose, fructose and maltose, or any combination thereof, preferably sucrose, up to about 30 percent by weight of the total intimate admixture. When the propoxyphene napsylate content is about 70 percent or more, the sole excipient can be one of the saccharides, or a combination thereof. Either gelatinized starch powder or microcrystalline cellulose, or a combination thereof, must supplement the saccharide when the propoxyphene napsylate concentration is below 70 percent of the total.

The intimate admixture component of the novel pharmaceutical preparation of this invention is comprised of from about 50 to about 80 percent propoxyphene napsylate; from about 0 to about 5 percent gelatinized starch; from about 0 to about 25 percent microcrystalline cellulose; and from about 0 to about 30 percent of a saccharide selected from the class consisting of sucrose, dextrose, lactose, fructose, and maltose, or a combination thereof.

The useful pharmaceutical preparation of the instant invention, comprised of an intimate admixture as described above is further comprised of a granulating agent selected from the group consisting of partially hydrolyzed starch, sdium carboxymethylcellulose, methylcellulose, hydroxypropylmethylcellose and polyvinyl-pyrrolidone in an amount of from about 0.4 to about 4.0 percent by weight of said pharmaceutical preparation. Hence said pharmaceutical preparation is comprised of from about 96 to about 99.6 percent of said intimate admixture and from about 0.4 to about 4.0 percent of said granulating agent.

In a preferred embodiment of this invention, the useful timed-release pharmaceutical preparation of propoxyphene napsylate is comprised of (a) about 98.75 percent of an intimate admixture of about 70 percent propoxyphene napsylate, about 2.5 percent gelatinized starch, about 12.5 percent microcrystalline starch, and about 15 percent sucrose, and (b) about 1.25 percent of sodium carboxymethylcellulose as a granulating agent.

The propoxyphene napsylate, gelatinized starch powder, microcrystalline cellulose and sucrose are combined in a suitable blender and mixed until an intimate admixture is obtained. This requires from about 5 to about 30 minutes, depending on the efficiency of the blender. Independently, a 5 percent dispersion of sodium carboxymethylcellulose is prepared by hydrating the cellulose derivative for an hour or more with vigorous agitation. The procedure for the hydration of sodium carboxymethylcellulose is well known in the art.

The properly hydrated sodium craboxymethylcellulose dispersion is added to the intimate admixture in an amount of about 25 milliliters per 100 grams of said admixture. The addition of the hydrated sodium carboxymethylcellulose to the intimate admixture is accompanied by vigorous mixing and proceeds slowly to assure a uniform blending. The blending operation is continued until an homogeneous plastic dough-like composition has been achieved.

The thus prepared plastic dough-like composition is extruded under from about 25 to about 600 psig through a perforated plate forming an extrudate in elongated strands. The length of the strands generally greatly exceeds the cross-sectional dimension by several times.

The elongated strands of extrudate can be air or kiln dried at temperatures up to 120° F. to remove the excess water and reduce the moisture content to about 2 percent.

The dried extrudate can be reduced to smaller particles by rubbing through a screen having appropriate openings, or passed through a low energy hammer mill.

Preferably, the elongated strands of extrudate, while still damp, are contacted by a moving frictional plate, said plate being of either a flat or curved form and having either a smooth or serrated surface, preferably the latter, said frictional plate moving at a velocity sufficient to overcome the inertia of said extrudate. The moving frictional plate sets up a rolling, tumbling bed of extrudate, and in such bed the elongated strands are reduced in length into particles having essentialy equal longitudinal and cross-sectional axes. Illustrative of devices wherein this operation can be performed are: (1) coating pans used in the pharmaceutical and confectionary industries and well known in the art. These pans can be operated satisfactorily whether set in a vertical plane or tilted at an angle. (b) granulating pans, also well known in the art, such as those used in pelletizing "taconite" iron ore for shipment and characterized by being of large diameter and with a relatively low integral circumferential side wall confining the particles on the flat surface. These pans are generally operated at a slight angle, perhaps 15° off the horizontal and are rotated slowly. (c) an apparatus for making spherical granules from wet plastic extrusions, comprising a stationary vertical cylindrical container having a rotatable flat or outwardly curved circular frictional plate disposed therein, said plate being disposed on a shaft at approximately a right angle thereto, such device being subject of U.S. Pat. No. 3,277,520.

The particles of extrudate can then be air or kiln dried at temperatures up to 120° F. to reduce the moisture content to about 5 percent.

The novel preparation of this invention possesses exceptional and unexpected timed-release characteristics. Ordinarily, a pharmacologically active agent such as propoxyphene napsylate would be expected to be completely available immediately upon oral ingestion when administered in any of the conventional pharmaceutical dosage forms. When propoxyphene napsylate is admixed with any of the materials comprising the excipients detailed herein and the mixture is processed into any one of the oral dosage forms following procedures well known in the art, all of the active agents becomes biologically available immediately after the dosage form is administered.

Now it has been found that a novel pharmaceutical preparation having timed-release properties can be provided by combining propoxyphene napsylate in an intimate admixture as hereinabove detailed, blending said intimate admixture with an appropriate granulating agent such as one of those described herein which has been dispersed in an aqueous vehicle as hereinbefore discussed, and extruding the thus prepared plastic dough-like preparation under pressure through a perforated plate forming elongated strands of extrudate and drying such extrudate to a moisture content of about 2 percent.

Various criteria can be established for timed-release oral preparations. These can vary from active agent to active agent. A generalized definition for a timed-release medication describes a pharmaceutical dosage form from which the active agent becomes biologically available over an extended period of time to the species to which the medication is orally administered. This is in contrast to an immediate-release medication from which the active agent is all biologically available soon after ingestion. Ideally, a sufficient amount of the active principal in a timed-release dosage form should be immediately available biologically, so that a rapid onset of pharmacological action can be experienced. Then there should be a slow but continuous release of the active ingredient over the following few hours, so that there can be a replenishment of the active agent to the ingestor, replacing that which is excreted or metabolized and thus rendered ineffective pharmacologically.

In the case of propoxyphene napsylate, it was determined that the ideal timed-release dosage form should provide an immediate release (within 30 minutes) of about 25 percent of the total amount of the active agent ingested. Abut 40 percent should be available within 2 hours, and the remaining 60 percent should gradually be released over the following 6 hours at the rate of about 10 percent per hour. FIG. 1 shows the release of propoxyphene napsylate from the useful pharmaceutical preparation of this invention over a seven hour period. The readings are based on in vitro analyses of the amount of propoxyphene napsylate released into an extracting fluid as determined by the in vitro test procedure for timed-release tablets and capsules. [National Formulary XIII, pp 882–3, General Tests, (1970) ]. The profile of an actual batch of timed-release propoxyphene napsylate particles of the novel composition of this invention is shown by the broken line. The ideal profile is shown by the continuous line.

A timed-release propoxyphene napsylate composition serves the useful purpose of reducing the frequency of administration of the dosage form, as it is possible to prepare a dosage form which will release the active agent over an extended period to provide up to 12 hours of pharmacological activity in the species to which the dosage form is administered. This compares with from 4 to 6 hours of pharmacological activity from an ordinary immediate-release dosage form.

Another aspect of this invention relates to the method of preparing a timed-release pharmaceutical preparation of propoxyphene napsylate for oral administration.

The first step in this useful process comprises combining propoxyphene napsylate in an intimate admixture with an excipient or combination of excipients selected from the group consisting of gelatinized starch powder, microcrystalline cellulose, and a saccharidde selected from the class consisting of sucrose, dextrose, lactose, fructose and maltose.

The intimate admixture described above can be prepared by adding the desired material in any order to a ribbon blender, tumbling cone, twin-shell blender, vertical mixer, paddle mixer, sigma arm mixer, pony mixer, or the like, and blending for from about 5 to about 30 minutes. Preferably, the mixing is done in a sigma arm mixer or a pony mixer as this equipment is eminently satisfactory for use in the next step.

An intimate admixture, appropriate for preparing a timed-release propoxyphene napsylate, can comprise from about 50 to about 80 percent propoxyphene napsylate, 0 to about 5 percent gelatinized starch, 0 to about 25 percent microcrystalline cellulose, and 0 to about 30 percent of a saccharide selected from the class consisting of succrose, dextrose, lactose, fructose, or maltose, or a combination thereof. Preferably, the intimate admixture is comprised of about 70 percent propoxyphene napsylate, about 2.5 percent gelatinized starch, about 12.5 percent microcrystalline cellulose, and about 15 percent sucrose.

As indicated above, the preferred formulation for the intimate admixture comprises three excipients. It is not a requirement that the intimate admixture contain all three of the excipients, as any one of them can be used up to the maximum percentage discussed hereinabove to the exclusion of one or more of the denoted materials. Neither is it necessary that the saccharide content be limited to one of the named sugars, satisfactory timed-release characteristics being developed from any conceivable mixture of the five saccharides as well as by any one alone.

The second step in the useful process of this invention involves blending the intimate admixture of the first step with a granulating agent selected from the group consisting of partially hydrolyzed starch, sodium carboxymethylcellulose, methycellulose, hydroxypropymethylcellulose and polyvinylpyrrolidone.

The blending step is preferably done in a sigma arm mixer or a pony mixer. An efficient ribbon blender will suffice, but if the intimate admixture has been prepared in a tumbling cone, twin-shell blender, vertical mixer, paddle mixer, or the like, said intimate admixture should be transferred to one of the first named mixers for the second step.

Independently, a aqueous dispersion of one of the granulating agents is prepared. In the case of partially hydrolyzed starch, from about 1 to about 10 percent by weight is added to water at or about room temperature and the resultant dispersion cooked for from about 1 to about 5 minutes at from about 40° to about 70° C. until some of the starch cells are ruptured and the dispersion thickens. Those skilled in the art will recognize this as a partially hydrolyzed starch paste. The cellulosics are dispersed in room temperature water in an amount of from about 1 to about 5 percent by weight and the resultant dispersion vigorously is agitated for about 5 to about 30 minutes. Preferably the cellulosics are permitted to hydrate for up to about 12 hours before the aqueous dispersion is used. The polyvinylpyrrolidone is dispersed in room temperature water in an amount of from about 1 to about 5 percent by weight and vigorously agitated for about 30 minutes before the aqueous dispersion is employed.

With the intimate admixture is a suitable mixer, one of the granulating agents detailed hereinbefore and prepared as described immediately above is added slowly to the mixing intimate admixture. From about 10 to about 40 milliliters of the aqueous dispersion of the granulating agent is used per 100 grams of intimate admixture. Preferably, about 25 milliliters of a 5 percent aqueous dispersion of sodium carboxymethylcellulose is added per 100 grams of intimate admixture. The mixing of the aqueous disersion of the granulating agent and the intimate admixture is continued until a uniform homogenous blend is achieved, resulting in a plastic dough-like composition.

The plastic dough-like composition prepared in step 2 is extruded under pressure through a perforated plate forming elongated strands of plastic extrudate. Extruders which can be employed are well known in the art. Generally, the wet plastic dough is fed into a hopper over one end of a rotating screw auger disposed in a cylinder. The screw auger transports the plastic dough the length of the cylinder and discharges said dough into an annular space defined on one or more sides by a perforated plate. The plastic dough is forced through the perforations by the pressure created by transporting more of said dough into said annular space than can be confined therein. The faster the dough accumulates in the annular space the greater the pressure being exerted to force said dough through the perforations in said plate. Elongated strands of plastic extrudate formed under pressure behind the perforated plate of from about 25 to about 600 psig are suitable for further processing into propoxyphene napsylate timed-release particles. Greater pressures may be applied, but such are not required and are not recommended as unnecessary mechanical requirements accompany the higher pressures resulting in higher equipment and processing costs. Perforations with cross-sectional dimensions ranging from about 0.5 to about 8 millimeters are suitable, and round holes from about 1 to about 3 millimeters are preferred.

The elongated strands of plastic extrudate will vary in length from something a little more than the cross-sectional dimension to a measurement many times the breadth of said strand. The length will vary with the relation of the perforated plate to the vertical. A plate set on the vertical will form strands having a shorter length than those coming from a plate facing down. Furthermore, the cross-sectional dimension of the perforations also influences the length of the strands. In any event, the strands of plastic extrudate do not tend to stick together under normal handling and can be spread on trays for drying or added directly to a particle forming apparatus without encountering aggregation, aglomeration, coalescing or disintegration.

While it is possible to remove the excess moisture from the strands of plastic extrudate prior to forming particles having essentially equal cross-sectional and longitudinal axes therefrom, it is preferred that such particles are formed before the excess moisture is removed.

The elongated strands of plastic extrudate can be spread on drying trays and air dried at room temperature or kiln dried at temperatures up to 120° F. The thus dried extrudate can then be sized by rubbing the strands through a screen having appropriately sized openings therein, or subjected to a low energy hammer mill operation. These processes are well known in the art and are frequently employed.

Preferably, however, the plastic extrudate strands are reduced to particles having a cross-sectional dimension essentially equal to their length before the excess moisture is removed. This can be done by processing the strands in any one of the existing devices having in common a frictional plate on which the strands are placed and which can be moved or rotated with sufficient velocity to overcome the inertia of said strands, said strands being confined to a predetermined space by out-boards which can be integral with the frictional plate and move with it, or stationarily disposed in a relationship with the frictional plate so as to confine the strands thereon.

Illustrative of some of the apparatus which can be employed to form said particles from said strands are: (a) coating pans conventionally utilized in the pharmaceutical and confectionary industries; (b) pelletizing pans employed in pelletizing "taconite" iron ore for shipment and making granular fertilizers. (c) a device such as the subject of U.S. Pat. No. 3,277,520, wherein a circular frictional plate is mounted horizontally within a vertically disosed stationary cylindrical vessel, said plate being disposed on a rotatable shaft having means to propel said shaft.

The forming of the particles of timed-release propoxyphene napsylate is accomplished by contacting said strands of plastic extrudate with a frictional plate moving at a velocity sufficient to overcome the inertia of said extrudate; imparting velocity to said extrudate such that said extrudate moves in a rolling, tumbling bed; and continuing such movement until said extrudate is reduced to particles having essentially equal cross-sectional and longitudinal axes. Preferably, the extrudate reduction is accomplished by: 1) contacting said extrudate with a circular frictional plate mounted horizontally in a vertically disposed stationary cylindrical vessel; 2) rotating said plate at a speed sufficient to overcome the inertia of said extrudate; 3) imparting velocity to said extrudate such that said extrudate moves in a curved path toward the periphery of said plate; 4) establishing a moving toroidal ring of said extrudate; and 5) continuing such movement until said extrudate is reduced to particles having essentially equal longitudinal and cross-sectional axes.

The fifth, and final, step in the useful method of this invention comprises drying the particles of step 4 until the residual moisture is about 2 percent. The drying operation can be accomplished by spreading said particles on trays and air drying at room temperatures or kiln drying at temperatures up to about 120° F., or loading said particles into a fluidized bed dryer and blowing warm dry air through the fluidized bed of said particles.

Timed-release particles prepared by the novel process of this invention are useful in compounding pharmaceutical dosage forms for oral administration. Such dosage forms provide propoxyphene napsylate release rates comparable to those shown in FIG. 1. As discussed hereinabove, such release rates assure pharmacological activity for up to 12 hours from one oral administration.

This invention is further illustrated by the following example.

EXAMPLE 1

To a small pony mixer tub were added: propoxyphene napsylate, 7 kg.; sucrose powder, 1.5 kg.; microcrystalline cellulose, 1.25 kg.; and gelatinized starch powder, 0.25 kg. The combination was mixed for 15 minutes, and an intimate admixture achieved.

About 12 hours earlier, sodium carboxymethylcellulose, 0.125 kg. was added to purified water, 2.5 l., mixed thoroughly for about 5 minutes and allowed to stand to accomplish complete hydration.

The previously hydrated dispersion of sodium carboxymethylcellulose was slowly added over a 2–3 minute period to the intimate admixture in the pony mixer with the mixer running. The mixer was run for an additional 20 minutes, and an homogenous plastic dough-like composition was achieved.

The plastic dough-like composition thus prepared was extruded through 1.1 millimeter round perforations into elongated strands under a pressure of about 150 psig.

The elongated strands of extrudate were removed from the extruder and contacted with a circular frictional plate mounted horizontally in a vertically disposed stationary cylindrical vessel. The plate was rotated at a speed of 1,000 rpm, imparting a velocity to the extrudate sufficient to overcome the inertia of said extrudate and establish a moving toroidal ring of said extrudate. The rotational movement was continued for 1 ½ minutes, after which the particles were spread on drying trays and dried at room temperature for 36 hours.

The dried particles were passed over a no. 16 screen (U.S. mesh) and those which passed through subjected to a no. 25 screen (U.S. mesh). Paticles passing the no. 16 screen and held on the no. 25 screen were filled into two piece gelatin capsules. The over-and undersized particles were set aside to be recycled.

The acceptable particles were subjected to the N.F. dissolution test described hereinabove and a dissolution profile similar to that shown in FIG. 1 was obtained.

What is claimed is:

1. A timed-release pharmaceutical preparation for oral administration comprising an extrudate comprised of (a) an intimate admixture consisting of propoxyphene napsylate and an excipient or a combination of excipients selected from the group consisting of gelatinized starch, microcrystalline cellulose, and a saccharide selected from the class consisting of sucrose, dextrose, lactose, fructose, and maltose, and (b) a granulating agent selected from the group consisting of partially hydrolyzed starch, sodium carboxymethylcellulose, methylcellulose, hydroxypropylmethylcellulose, and polyvinylpyrrolidone.

2. The pharmaceutical preparation of claim 1 wherein said intimate admixture is comprised of from about 50 to about 80 percent propoxyphene napsylate; from about 0 to about 5 percent gelatinized starch; from about 0 to about 25 percent microcrystalline cellulose; and from about 0 to about 30 percent of a saccharide selected from the class consisting of sucrose, dextrose, lactose, fructose, and maltose.

3. The pharmaceutical preparation of claim 1 comprised of from about 96 to about 99.6 percent of said intimate admixture and from about 0.4 to about 4 percent of said granulating agent.

4. The pharmaceutical preparation of claim 1 comprised of (a) about 98.75 percent of an intimate admixture of about 70 percent propoxyphene napsylate; and 2.5 percent gelatinized starch; about 12.5 percent microcrystalline cellulose; and about 15 percent sucrose, and (b) about 1.25 percent of sodium carboxymethylcellulose as a granulating agent.

5. A method of preparing a timed-release pharmaceutical preparation for oral administration comprising:
   a. combining propoxyphene napsylate in an intimate admixture with an excipient or a combination of excipients selected from the group consisting of gelatinized starch, microcrystalline cellulose, and a saccharide selected from the class consisting of sucrose, dextrose, lactose, fructose and maltose;
   b. blending the intimate admixture of (a) with an aqueous dispersion of a granulating agent selected from the group consisting of partially hydrolyzed starch, sodium carboxymethylcellulose, methylcellulose, hydroxypropylmethylcellulose, and polyvinylpyrrolidone;

c. extruding the blend of (b) under pressure through a perforated plate forming an extrudate of elongated strands having a length generally exceeding the cross-sectional dimension;

d. reducing the strands of extrudate (c) into particles having essentially equal cross-sectional and longitudinal axes;

e. removing the excess water from the particles of (d).

6. The method of claim 5 wherein the intimate admixture of (a) is comprised of from about 50 to about 80 percent propoxyphene napsylate, 0 to about 5 percent gelatinized starch, 0 to about 25 percent microcrystalline cellulose, and 0 to about 30 percent of a saccharide selected from the class consisting of sucrose, dextrose, lactose, fructose, or maltose, or a combination thereof.

7. The method of claim 5 wherein the intimate admixture of (a) is comprised of about 70 percent propoxyphene napsylate, about 2.5 percent gelatinized starch, about 12.5 percent microcrystalline cellulose, and about 15 percent sucrose.

8. The method of claim 5 wherein the aqueous dispersion of a granulating agent of (b) is selected from the groups consisting of about 1.0 to about 10 percent partially hydrolyzed starch paste, and about 1.0 to about 5.0 percent aqueous dispersions of sodium carboxymethylcellulose methylcellulose, hydroxypropylmethylcellulose, and polyvinylpyrrolidone.

9. The method of claim 5 wherein the aqueous dispersion of a granulating agent of (b) is employed in an amount of from about 10 to about 40 milliliters per 100 grams of the intimate admixture of (a).

10. The method of claim 5 wherein 100 grams of the intimate mixture of (a) is blended with about 25 milliliters of a 5 percent aqueous dispersion of sodium carboxymethyl cellulose.

11. The method of claim 5 wherein the strands of extrudate (c) are formed at a pressure of from about 25 to about 600 psig.

12. The method of claim 5 wherein the reduction (d) of the strands of extrudate is accomplished by contacting said extrudate with a moving frictional plate; moving said frictional plate at a velocity sufficient to overcome the inertia of said extrudate; imparting velocity to said extrudate such that said extrudate moves in a rolling, tumbling bed; and continuing such movement until said extrudate is reduced into particles having essentially equal longitudinal and cross-sectional axes.

13. The method of claim 12 wherein the moving frictional plate is a circular frictional plate mounted horizontally in a vertically disposed stationary cylindrical vessel.

14. The method of claim 5 comprising:

a. combining in an intimate admixture
   1. 70 percent propoxyphene napsylate,
   2. 2.5 percent gelatinized starch,
   3. 12.5 percent microcrystalline cellulose, and
   4. 15 percent sucrose;

b. blending said intimate admixture of (a) with about 25 milliliters of about a 5 percent aqueous dispersion of sodium carboxymethylcellulose per 100 grams of said intimate admixture;

c. extruding the blend of (b) under a pressure of from about 25 to about 600 psig through a perforated plate into elongated strands having a longitudinal dimension greater than the cross-sectional dimension;

d. reducing the extruded strands of (c) by:
   1. contacting said strands with a circular frictional plate mounted horizontally in a vertically disposed stationary cylindrical vessel;
   2. rotating said plate at a speed sufficient to overcome the inertia of said strands;
   3. imparting velocity to said strands such that said strands move in a curved path toward the periphery of said plate;
   4. establishing a moving toroidal ring of said strands; and
   5. continuing such movement until said strands are reduced into particles having essentially equal cross-sectional and longitudinal axes; and e. drying the particles of (d) to a moisture content of about 5 percent.

* * * * *